United States Patent

[11] 3,543,923

| [72] | Inventors | Gordon C. Hildred<br>Calgary, Alberta;<br>John T. Higgins, Trail, British Columbia, Canada |
|---|---|---|
| [21] | Appl. No. | 816,852 |
| [22] | Filed | Jan. 22, 1969<br>Division of Ser. No. 481,053,<br>Aug. 19, 1965, abandoned. |
| [45] | Patented | Dec. 1, 1970 |
| [73] | Assignee | Cominco Ltd.<br>Montreal, Quebec, Canada<br>a corporation of Canada |

[54] DRUM GRANULATION
3 Claims, 3 Drawing Figs.

[52] U.S. Cl. .................................................. 209/11,
209/139, 23/103
[51] Int. Cl. ........................................................ B07b 7/86
[50] Field of Search .......................................... 209/138,
139, 130, 141, 11, 152, 452; 23/103

[56] References Cited
UNITED STATES PATENTS

| 840,724 | 1/1907 | Sweet | 209/143 |
| 1,159,168 | 11/1915 | Broome | 209/143X |
| 1,186,874 | 6/1916 | Baer | 209/152 |
| 2,899,139 | 8/1959 | Hardinge | 209/138X |
| 3,232,703 | 2/1966 | Thompson | 23/103 |

Primary Examiner—Tim E. Miles
Attorney—Arne I. Fors

ABSTRACT: This disclosure provides a method for separation and recovery of entrained solids from cooling air exhausting from a rotating drum in which moving gases employed for the cooling of granules are reduced in velocity and deflected downwardly into a slowly rising column of gas in a separation zone and the velocity of the rising gas is controlled for classification and primary separation and recovery of solids carried by the cooling gas.

Patented Dec. 1, 1970 3,543,923

INVENTOR.
GORDON C. HILDRED
JOHN T. HIGGINS

BY

*Arne T. Fors*

Agent

DRUM GRANULATION

This is a division of U.S. Pat. application Ser. No. 481,053 filed Aug. 19, 1965 now abandoned.

This invention relates to an improved drum granulation method and apparatus.

The production of granular fertilizers from nitrogenous compounds such as ammonium nitrate and urea by spraying the molten compound onto solid particles in a rotating drum and solidifying the melt by cooling the particles in a current of cool air passing through the drum is described in U.S. Pat. No. 3,232,703 issued Feb. 1, 1966 and U.S. Pat. No. 3,398,191 issued Aug. 20, 1968.

In preferred embodiments, the processes of those applications are carried out in a substantially horizontal rotating drum divided by a retaining ring into two contiguous sections, or chambers, one of which encloses a granulating zone and the other a cooling zone.

The process comprises the steps of forming a bed of continuously moving solid particles or nuclei of fertilizer compound in the granulating zone of the rotating drum; advancing the particles through the granulating zone; spraying a molten, substantially anhydrous melt of the nitrogenous compound at a temperature of 5 to 25° C. degrees above its crystallization temperature onto the bed and into a continuously cascading curtain of solid particles in the granulating zone; simultaneously contacting the curtain of solid particles with a current of cooling air flowing countercurrent to the direction of the advance of the particles; continuously passing solid particles from the granulating zone to the cooling zone of the rotating drum and continuously passing cooling air from the cooling zone to the granulating zone; passing solid particles through the cooling zone countercurrent to a stream of cooling air flowing through said cooling zone; withdrawing cooled solid particles from the cooling zone; separating and collecting particles of the desired size from the withdrawn particles; and recycling undersize and crushed oversize particles to the granulating zone.

The granules produced by this process have a number of desirable characteristics; in particular, the granules are harder, stronger, larger and more uniformly sized than the conventional prilled material. Test work has shown that ammonium nitrate granules produced by this process have a crushing strength in excess of 2500 grams whereas on the same relative scale the crushing strength of prills is only about 1000 grams.

A problem inherent in the operation of such a drum granulation process exists in the discharge and accumulation of "breech fines" which originate at the feed inlet end of the granulator drum as a result of entrainment of solids in the horizontal flow of cooling air discharging through the feed inlet end of the drum. Coarse, product size and fine particles swept from the curtain of showering nuclei together with dust produced by attrition and by solidification of fine spray droplets are carried out of the granulator and, in flowing through the breech and exhaust air duct, impinge on and adhere to the walls of these components to form deposits which obstruct the flow of air therethrough and which impede proper functioning of the equipment.

We have found that the provision of a breech enclosing the feed inlet to the rotary drum and having an open hopper bottom, and a baffle mounted within the breech between the drum feed inlet opening and breech exhaust air outlet, in combination with cool tramp air introduced by way of the hopper opening, controls the flow and disposition of fines within the breech such that classification and primary separation and recovery of essentially all solids suitable as nuclei from the exhaust air are effected therein and only the dust which constitutes the remaining portion of the solids entering the breech from the granulator drum is carried upwardly out of the breech with the exhaust gases for secondary separation and recovery. The breech fines comprising coarse, product size and fine material of a size suitable for nuclei (e.g. 35 mesh and coarser), are cooled as they settle under relatively quiescent, free settling conditions in the breech to discharge out of the hopper bottom opening. The breech fines thus recovered normally are recycled to the drum as nuclei. The cooling of the breech fines by the tramp air ensures that the liquid phase content of the fines is lowered sufficiently to obviate the problem of the fines clinging to and accumulating on the breech walls.

It is, therefore, a principal object of the present invention to provide a method and apparatus for the recovery of a substantial portion of the solid material discharged from the inlet end of a rotary drum granulator with the exhaust cooling air for direct recycle of said recovered solids.

It is another object of the present invention to recover solid nuclei suitable for the operation of the granulation process.

Another object of the present invention is the provision of simple and reliable means for controlling the flow of cooling air discharging through the breech and for introducing a slowly rising column of exhaust air to the breech for optimum cooling of the solids and to reduce the adherence between the hot solids swept into the breech and the breech walls thereby preventing a build up of solids thereon.

And another object of the present invention is the effective classification and separation and recovery of all but very fine solids from the exhaust air to reduce the load to secondary dust recovery components and to avoid unnecessary redissolution of recovered solid material.

These and other objects of the present invention, and the manner in which they can be attained, will become apparent from the following detailed description of the operation of the process and apparatus with reference to the accompanying drawings, in which.

Like reference characters refer to like parts throughout the description of the drawing.

Figure 1:
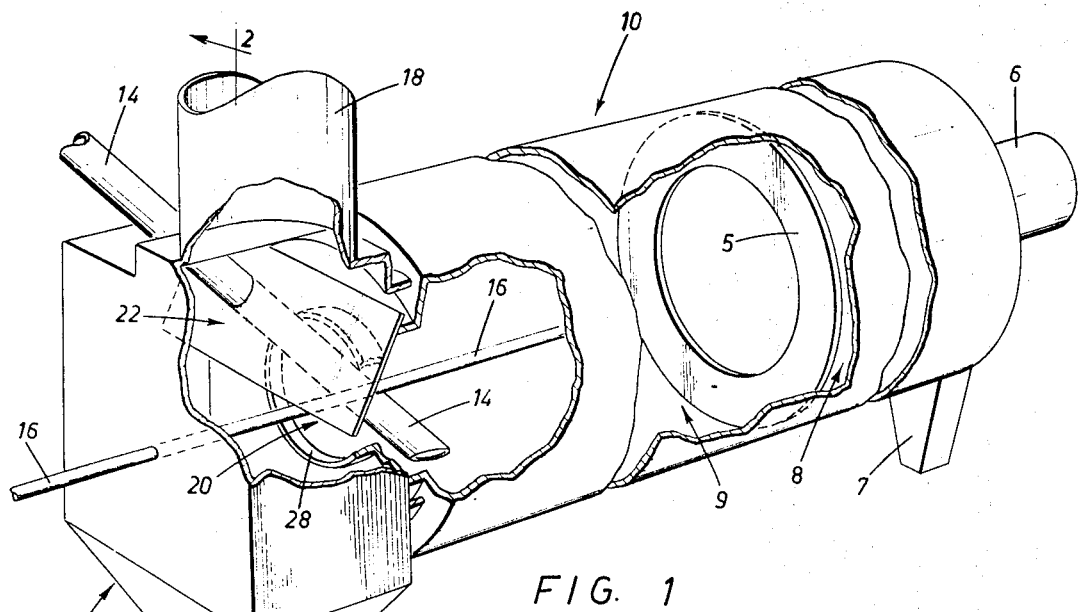
FIG. 1 is a perspective view, partly cut away of a drum granulator having the improvement of the present invention.
Figure 2:
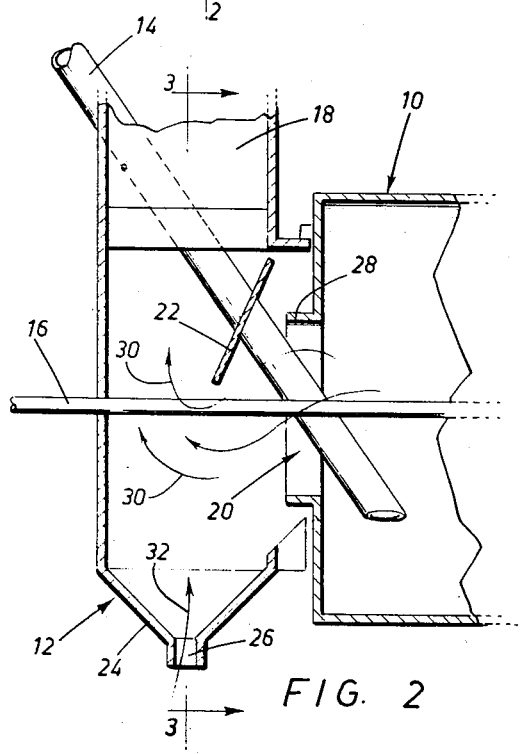
FIG. 2 is a vertical section taken along the line 2–2 of FIG. 1 showing the improvement of the present invention in more detail.
Figure 3:
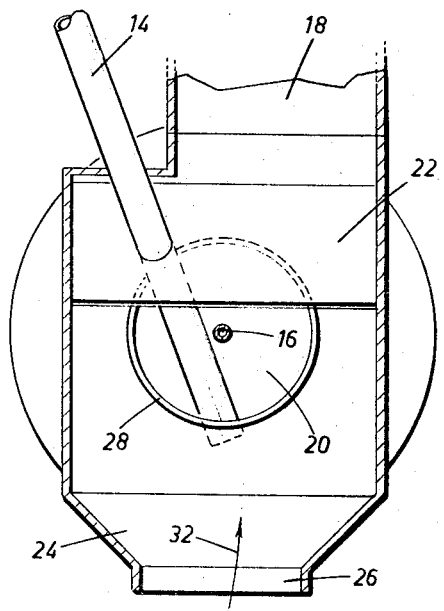
FIG. 3 is a vertical section taken along the line 3–3 of FIG. 2.

With reference not to FIG. 1, numeral 10 designates a horizontal drum granulator having an air inlet 6 and a granule outlet 7 at its discharge end, and a breech 12 formed at its feed inlet end permitting rotation of the drum therein. A retaining ring 5 divides the drum into two sections of approximately equal length, one section constituting the granulating zone 9 and the other section the cooling zone 8. Both sections of the drum are provided with lifters. Feed pipes 14 and 16 positioned in the top portion of breech 12 extend into the granulating zone 9 of drum 10 and permit introduction of nuclei and the nitrogenous molt respectively to said zone. Duct 18 formed in the upper portion of breech 12 permits the exhaust of cooling air discharging horizontally from drum 10 by way of feed inlet opening 20. A baffle 22 is positioned within breech 12 opposite the upper portion of feed inlet opening 20 between said feed inlet opening and the breech wall opening to duct 18 and at an oblique angle to the plane of said feed inlet opening. Turning now to FIGS. 2 and 3, breech 12 has a hopper bottom 24 with central opening 26. Flanged rim 28 of drum 10 projects into breech 12 a predetermined short distance to prevent the discharge of solids from the system at the juncture of the drum and breech. An enclosed conveyor connecting with an elevator, not shown, is positioned below hopper opening 26 for receiving solids discharged from breech hopper 24 and conveying said solids to the elevator for recycle to feed pipe 14.

In operation, a flow of cooling air designated by arrows 30 discharges from drum 10 through feed inlet opening 20, passes downwardly about the lower edge of baffle 22 positioned in breech 12, and travels upwardly to discharge from breech 12 by way of exhaust duct 18. The suction created by an exhaust fan positioned downstream in duct 18 not only pulls the flow of cooling air through the air inlet 6, cooling zone 8, granulating zone 9 and feed inlet opening 20 of drum 10, but also induces a flow of cool tramp air, designated by arrows 32, upwardly through hopper opening 26, which, in rising through breech 12, merges with the cooling air discharging from drum 10. The merged gases discharge through exhaust duct 18. Solid particles, including product size granules, nuclei and attrition fines, entrained in the exhaust cooling air are deflected downwardly by baffle 22 as the air is discharged from drum 10. The cross-sectional area of breech 12 is appreciably larger than that of opening 20, so the air velocity is reduced as the air enters the breech. Entrained solids, therefore, settle out of the current of air 30 into the relatively quiescent, slowly rising column of tramp air 32. In that the cross-sectional area of breech 12 in the upper and central portions of hopper 24 is at a maximum, it will be evident that the velocity of the tramp air 32 is minimal there and since the flow of ramp air introduced through opening 26 is low, classification of solids occurs whereby particles as small as 35 mesh in size readily settle downwardly towards the hopper bottom under free-settling conditions. As the tramp air velocity is higher in proximity to opening 26 because of the reduction of cross-sectional area, hindered settling conditions prevail and the coarse and product size particles accumulate and drop by gravity through the said hopper opening carrying therewith much of the fine size particles suitable for nuclei. The hopper opening 26 is large enough, of course, to allow passage of the settled solids without plugging. The solids thus recovered from the solids-separation zone between the hopper opening 26 and the level at which the air flows merge are conveyed and elevated to feed pipe 14 for recycle to the granulating zone of drum 10.

Dust entrained in the drum exhaust air and tramp air discharging from breech 12 through duct 18 is separated from air by secondary recovery means such as a wet scrubber, not shown.

Although it will be understood that the invention is free of hypothetical considerations, it is believed the slowly rising column of tramp air 32 acts as a buffer to substantially obviate turbulence in the lower portion of breech 12 normally caused by the flow of cooling air and, because of the low air velocity and relatively quiescent conditions in the hopper, permits the accumulation and settling of solids. The warm solids thus are in contact for a sufficient time with cool tramp air 32 away from the breech walls to allow sufficient cooling to reduce the amount of liquid phase contained in said solids and thus the solids do not adhere to and cake on the said walls.

The present invention provides a number of important advantages. Solids normally discharged to the scrubbing circuit or caked on the breech and duct walls are recovered in solidified form in proximity to the granulating drum for recycle to the drum granulating zone to provide and function as a source of recoverable nuclei. Thus the load on the scrubbing and redissolution circuit is relieved, a source of recoverable nuclei for the granulating zone is provided, and the troublesome caking of solids in the breech and on duct walls is minimized.

It will be understood, of course, that improvements can be made in the process and apparatus of the present invention described hereinabove without departing from the scope and purview of the appended claims.

We claim:

1. A method for separation and recovery of hot, adherent solids entrained in air exhausting substantially horizontally from a rotating drum to a breech through an opening therebetween, said breech having a hopper bottom with an opening therein, comprising: deflecting said exhaust air with entrained solids downwardly in said breech into a solids-separation zone of enlarged cross-sectional area relative to each of the said openings for reducing the velocity of air flowing therethrough and to allow settling of entrained solids therein, inducing a flow of cool tramp air through said hopper bottom into said breech to provide a slowly rising column of cool air in said breech and maintaining the upward velocity of said slowly rising column of air below the free-settling velocity of a portion of the solids entrained in said exhaust air for effecting cooling, classification and separation of a portion of the entrained solids, withdrawing under suction upwardly from said solids-separation zone the exhaust and tramp air with entrained solids having a free-settling velocity less than the velocity of the rising column of air, and recovering from the hopper bottom of the breech collected solids having a settling velocity greater than the velocity of the rising column of tramp air.

2. In a method as claimed in claim 1, passing the exhaust air and slowly rising column of air from the breech to secondary recovery means for recovery of solids entrained therewith.

3. In a method as claimed in claim 1, recycling collected solids to the rotating drum.

UNITED STATES PATENT OFFICE
CERTIFICATE OF CORRECTION

Patent No. 3,543,923      Dated December 1, 1970

Inventor(s) Gordon C. Hildred et al.

It is certified that error appears in the above-identified patent and that said Letters Patent are hereby corrected as shown below:

Column 2, line 15, before "cooling" insert -- exhaust --; line 17, cancel "exhaust"; line 41, "not" should read -- now Signed and sealed this 25th day of May 1971.

(SEAL)
Attest:

EDWARD M. FLETCHER, JR.
Attesting Officer

WILLIAM E. SCHUYLER, JR.
Commissioner of Patents